United States Patent [19]

Steetle

[11] Patent Number: 4,538,251
[45] Date of Patent: Aug. 27, 1985

[54] MARINE SEISMIC STREAMER CABLE FOR PROVIDING SELECTABLE DETECTOR ARRAY CONNECTIONS

[75] Inventor: David R. Steetle, Houston, Tex.
[73] Assignee: Digicon, Inc., Houston, Tex.
[21] Appl. No.: 483,623
[22] Filed: Apr. 11, 1983

Related U.S. Application Data

[63] Continuation-in-part of Ser. No. 472,136, Mar. 4, 1983.

[51] Int. Cl.³ .............................................. G01V 1/38
[52] U.S. Cl. ................................... 367/154; 367/20; 367/22
[58] Field of Search .................... 367/20–22, 367/130, 153, 154, 177; 181/110; 178/63 R

[56] References Cited

U.S. PATENT DOCUMENTS

| 3,133,262 | 5/1964 | Strange | 367/20 |
| 3,436,722 | 4/1969 | Strange | 367/20 |
| 3,441,902 | 4/1965 | Savit | 367/22 |
| 3,852,708 | 12/1974 | Doolittle et al. | 367/20 |
| 3,887,897 | 6/1975 | Neitzel et al. | 367/20 |

Primary Examiner—Nelson Moskowitz
Assistant Examiner—Ian J. Lobo
Attorney, Agent, or Firm—Vaden, Eickenroht, Thompson & Jamison

[57] ABSTRACT

A marine seismic cable comprising a plurality of universal sections, each section including a plurality of fundamental arrays, preferably positioned end-to-end. Each of the arrays are separately wired to a logic circuit in one of the connectors or cans between sections and wiring is provided for connections to each of the fundamental arrays in at least an adjoining section. The logic circuits are controlled by control signals to produce composite responses from a selected grouping of fundamental arrays and, preferably, also to produce weighted or tapered responses by connecting and emphasizing each of the fundamental responses in the desired weighted manner.

12 Claims, 3 Drawing Figures

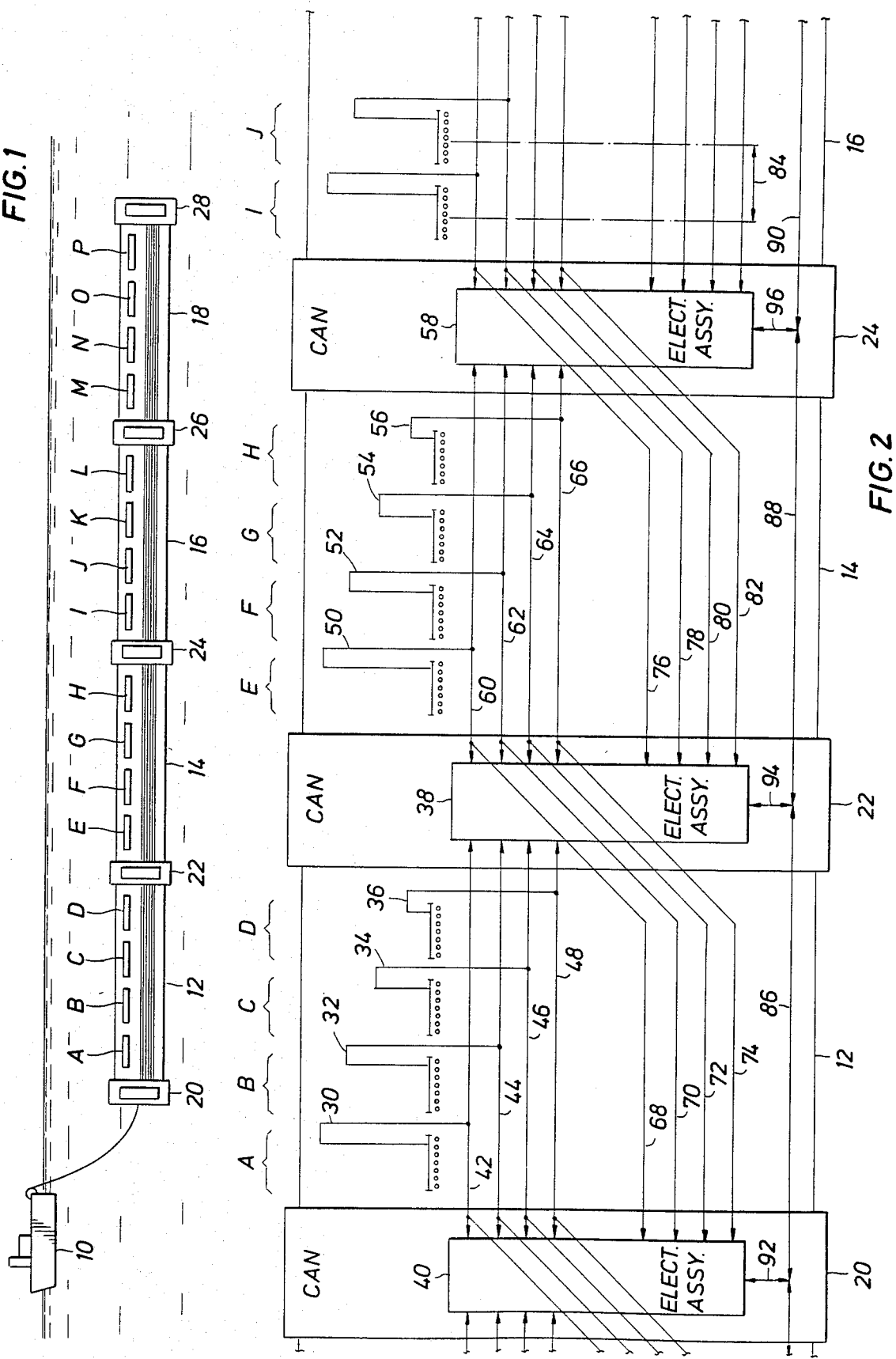

MARINE SEISMIC STREAMER CABLE FOR PROVIDING SELECTABLE DETECTOR ARRAY CONNECTIONS

This is a continuation-in-part application of patent application Ser. No. 472,136, filed Mar. 4, 1983, executed Feb. 17, 1983 by the same inventor, David R. Steetle, entitled "Marine Seismic Streamer Cable for Providing Selectable Detector Array Connections".

BACKGROUND OF THE INVENTION

1. Field of the Invention

This invention pertains to marine seismic exploration and more specifically to a marine seismic streamer cable made up of identical sections each having a plurality of detectors or detector arrays which are selectably operationally connected and controlled to produce improved overall responses.

2. Description of the Prior Art

A marine seismic streamer cable is ordinarily towed behind a marine vessel for the purpose of gathering meaningful seismic data. The vessel, using suitable means, also includes or tows a device or devices for generating suitable source impulses into the water. The acoustic seismic responses therefrom are detected using suitable pressure detectors or hydrophones positioned along the cable. Such a cable, in addition to the detectors, also includes the communication wiring for conditioning the hydrophones for response and for transmitting the signals created at the detectors back to the vessel for suitable processing and/or recording. Moreover, such a cable includes the necessary water-proofing and other suitable components for minimizing spurious interference and water contamination from interfering with the meaningful signals. Finally, paravanes or other suitable means are also provided for vertically positioning the cable at the desired water depth along its length.

Historically, marine cables were initially made up of detectors positioned in a predetermined manner for the desired operation. This was done in either a continuous cable or in a cable made up of sections unique from each other where the last of the sections was the least complex in makeup. This was because it did not include the communication wiring except for the signals originating in that section, whereas the intermediate sections included wiring for carrying the signals originating with the earlier sections. Hence, the sections that were located in the intermediate locations along the cable length were progressively more complex from the end of the cable toward the vessel. The connections also were progressively more complex in the same manner, since they provided individual connections for the more signal wiring that existed closer to the vessel.

In addition to the cable structures becoming more complex, over the years the detectors themselves have become more complex. Originally, a single detector produced a single seismic signal from the pressure field impinging on the detector. Later, the detectors were arrayed so that typically seven detectors were employed to produce a single signal, the individual detectors in the array producing noise cancellation components from detected unwanted pressures and the individual signals were stacked or reinforced from the meaningful detected pressures of the individual detectors. That is, by connecting the detectors in arrays, the signal-to-noise response ratios from the detectors were enhanced.

The next significant improvement in cable development to note was the development of uniform sections and connections therefor. This development allowed a streamer cable to be made up of multiple sections with little attention paid to which section went where in the overall cable. That is, the sections were interchangeable. Not only did this development mean that maintenance and repair problems were minimized, but inventory problems were also minimized. Typically, a cable section of 50 meters in length comprised two sequential arrays, each 25 meters long. Each data channel was associated either with one of the arrays or the two sequential arrays in the cable section hard-wired together. The data channel thus developed was connected forward in the cable section on its own communications two-wire pair. As a communications channel two-wire pair progressed forward, one cable section at a time, the information was "rolled over" in the connectors or "cans" to a subsequent pair of wires. It may then be recognized that the sections near the end of the cable had many wire pairs that were not used since there were no preceding sections developing information channels. However, the sections and the cans were standardized. In similar fashion, cable sections of 100 meters in length having four sequential arrays were common and were similarly connected.

It was also possible to modify the connections of such a cable by making one array of double length out of two of the previous length arrays. This is because the spacing of individual detectors in an array was the same as the spacing between the two adjoining detectors of sequential arrays. It should be noted that the flexibility was limited in that the hard-wired connections were made for a particular array length, it was not possible to change the array length without re-hard-wiring. This was usually done by changing the connectors, each connector usually including a certain amount of internal wiring to make the optional hard-wiring connection selected.

Although the longer arrays did improve signal-to-noise ratios, the group interval (distance from the center of one array or group to the center of an adjoining array) was increased, which resulted in so-called "data smear" and lost resolution. One way which has been employed to overcome the difficulty of excessively long group interval has been to arrange the arrays so that they overlap. In such an arrangement, the interval can be shortened, with the group length being longer. Of course, to have an overlapping arrangement of detectors meant that the cable structure was made more complex than before, requiring more detectors in the same cable length and requiring means of electronically isolating the arrays from one another. This meant additional wiring and insulation means for the same cable length, compared with structures that preceded this development in the art.

One way of achieving overlapping arrays in cable sections of standard or universal makeup is shown in U.S. Pat. No. 3,441,902. One cable length comprises one group of detectors connected together in a primary string P. The same cable length includes two secondary strings S1 and S2. When connected together to adjoining cable sections, one complete array or group of detectors comprises an S1 string from a first cable section, a P string from a second cable section, and an S2 string from a third cable section. It should be noted that there is only one way to connect the arrays in such a system for the development of the respective composite group signals, and therefore there is no connection flexibility. Furthermore, the communication wiring is complex with three sections in the cable being involved for each array.

U.S. Pat. No. 3,441,902 also illustrates another recognized desirable optional detection phenomenon, that of non-uniformly spacing the detectors in an array to taper the response. As most clearly shown in FIG. 3 of this patent, the spacing of the detectors near the center of the array is much closer than the spacing of the detectors near the extremities of the array. This spacing is approximately in a statistical bell-shaped gaussian distribution pattern. In short, it has been discovered that it is desirable for some purposes to employ non-uniformly spaced detectors. Again, in the illustrated and described system revealed in U.S. Pat. No. 3,441,902, there is no flexibility of connection.

Therefore, it is a feature of the present invention to provide an improved marine seismic streamer cable employing universal sections, each having multiple arrays of detectors that are selectably recordable to result in flexible connections thereof.

It is another feature of the present invention to provide an improved marine seismic streamer cable comprising universal sections and universal connectors, the connectors having logic components that are remotely operable for permitting flexibility of electronic connection of the arrayed detectors included in the cable sections.

It is still another feature of the present invention to provide an improved marine seismic streamer cable employing, in a preferred embodiment, means for selectively connecting arrays of long group length in the cable sections such that the group intervals are kept short without a physical overlapping arrangement of transducers.

It is yet another feature of the present invention to provide an improved marine seismic streamer cable employing, in a preferred embodiment, means for selectively providing tapered or weighted detector response without varying the spatial positioning of the individual detectors.

It is still another feature of the present invention to provide an improved marine seismic streamer cable employing, in a preferred embodiment, means for providing dynamic spatial filtering to the acoustic signal as a function of time.

It is yet another feature of the present invention to provide an improved marine seismic streamer cable employing, in a preferred embodiment, means for providing spatial filtering for the acoustic signal as a function of distance from the acoustic source.

SUMMARY OF THE INVENTION

The marine seismic cable described and claimed herein comprises a plurality of universal sections and connectors (so-called "cans"). Each of the sections comprises a plurality of arrayed detectors or groups of detectors. For example, each cable array comprises seven, evenly spaced detectors over a 12.5 meter length. Further, by way of example, a cable section typically comprises four of these groups located end-to-end in the cable, the total length of the physical layout for the detectors in the cable section being approximately 50 meters in length. Wiring from each group is to both the forward and rearward connectors or cans, the connections being made to an electronic assembly carried within the connectors. In addition, the electronic assembly in the rearward connector receives the forward wiring from the subsequent cable section, as well, which, in the above example, is a connection from each of the four groups in the subsequent cable section.

The electronic assembly of each connector is wired to receive a logic control signal for selectively compositing the arrays connected into that assembly. An output connection from the electronic assembly is then produced forward in the cable toward the vessel. The logic control signals can be made in logic code, in time multiplex fashion or on separate wires. In similar fashion, the outputs from the respective logic assemblies are connected forward either using the same wiring (and, hence, relying on time multiplexing to avoid signal interference) or separate wiring for each electronic assembly. It should be further apparent that when short composite arrays are selected by the logic control signals, multiple output signals are produced from each logic circuit. Desirable signal enhancement and noise attenuation can be provided by weighted filtering vis-a-vis the relative treatment of the data signals from the acoustic transducers as they are selectively chosen in an operational amplifier assembly connected for summing operation through optional resistor packs that selectively determine the gains of the individual summed elements.

BRIEF DESCRIPTION OF THE DRAWINGS

So that the manner in which the above-recited features, advantages and objects of the invention, as well as others which will become apparent, are attained and can be understood in detail, more particular description of the invention briefly summarized above may be had by reference to the embodiment thereof which is illustrated in the drawings, which drawings form a part of this specification. It is to be noted, however, that the appended drawings illustrate only a preferred embodiment of the invention and are therefore not to be considered limiting of its scope, as the invention may admit to other equally effective embodiments.

In the Drawings:

FIG. 1 is a simplified schematic representation of a portion of a preferred embodiment of a marine seismic cable in accordance with the present invention.

FIG. 2 is an expanded schematic representation of a portion of a marine seismic cable as illustrated in FIG. 1.

DESCRIPTION OF THE PREFERRED EMBODIMENT

Figure 3:
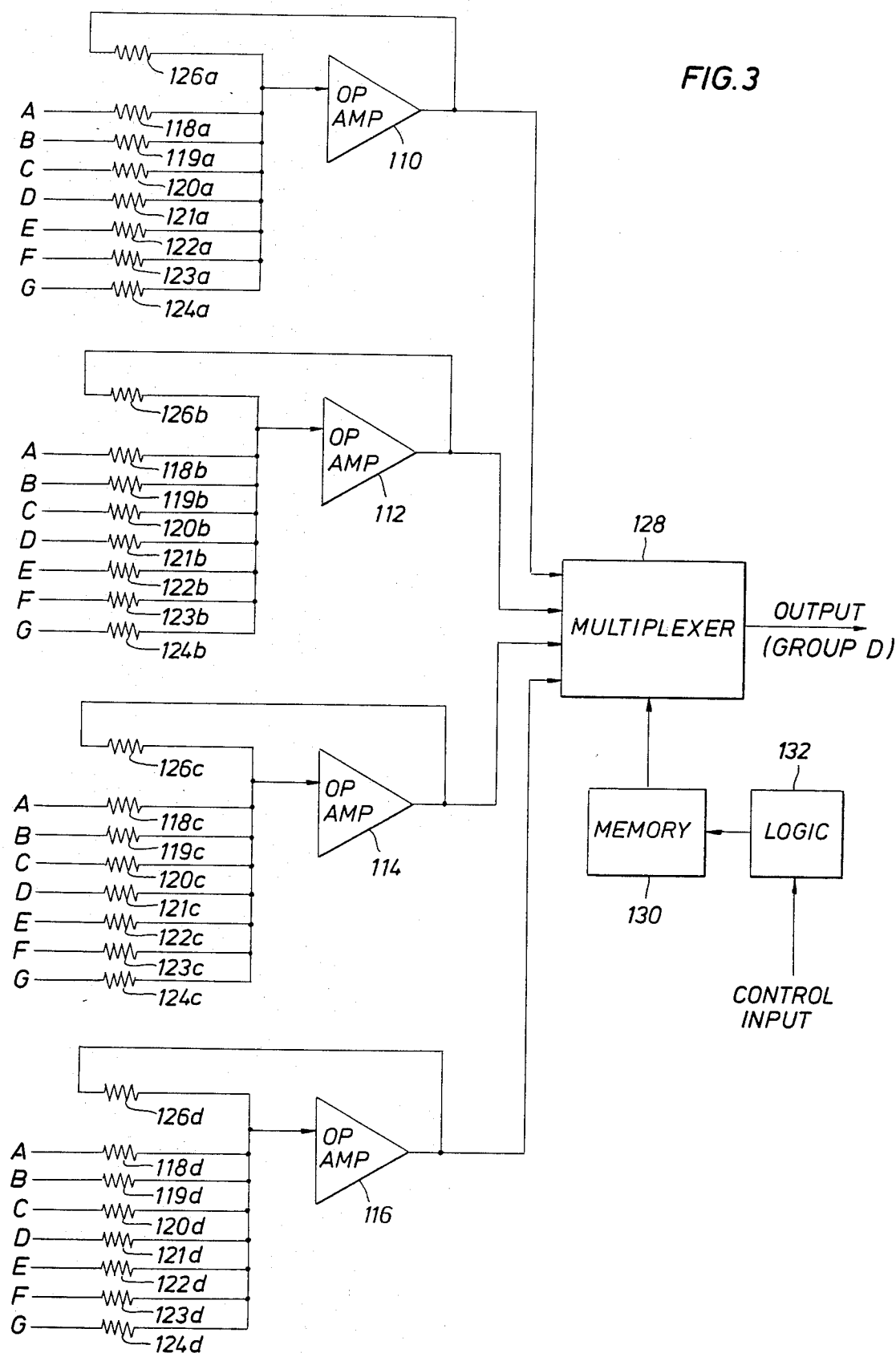
FIG. 3 is a block diagram of the preferred electronic selection assembly employed in the marine seismic cable in accordance with the present invention.

Now referring to the drawings and first to FIG. 1, a marine vessel 10 is schematically illustrated as towing a marine seismic cable in accordance with the present invention. Parts of the cable such as paravanes, isolating compartments, and the like not directly involved with the present invention have been omitted for the sake of clarity; however, such parts, all well known in the art, are included in the overall structure. The cable contains a plurality of universal or interchangeable sections, only four of which are illustrated in FIG. 1. The four cable sections are sections 12, 14, 16 and 18. Between the sections are connectors or "cans", which are diagrammatically shown as cans 20, 22, 24, 26 and 28. Inside each of the cans is an electronic assembly which is to be described hereinafter. In each of the cable sections are four illustrated arrays or groups of suitable seismic detectors or hydrophones, which are also described more completely with respect to FIG. 2. Detectors of the type employed, however, are well-known and are not further physically or individually operatively described. The illustrated four sections have sequential arrays of detectors A through P positioned end-to-end and without overlap. Also note that the cable sections include wiring for communicating control signals and developed detector signals in accordance with the invention, again hereafter described.

Referring to the expanded schematic representation shown in FIG. 2, ten sequential arrays A through J are illustrated. In cable section 12, arrays A through D are shown. In the example illustrated, each of these arrays or groups includes seven pressure detectors or hydrophones equally spaced apart over a length of 12.5 meters. Although each of these groups is shown for illustration convenience purposes as being spaced apart from the adjoining array, in one preferred arrangement, there is no substantial difference between the spacing of the detectors within an array and the end detectors in adjacent arrays. In other possible embodiment arrangements, the spacing of the detectors within the arrays can be varied, there can be more separation spacing within an array, and there can even be physical overlap of arrays.

The composite signal which is developed from array or group A is connected to rearward can 22 by lines 30 and 42, group B is connected to rearward can 22 by lines 32 and 44, group C is connected by lines 34 and 46 to rearward can 22 and group D is connected by lines 36 and 48 to rearward can 22.

Located within can 22 is an electronic assembly 38, the functional operation of which will be described hereinafter. In addition, forward can 20 also includes an electronic assembly 40 which is substantially identical to logic assembly 38 in can 22. Connections from groups A, B, C and D, which have just been described, are further respectively connected through wiring 42, 44, 46 and 48 in cable section 12 to logic assembly 40 in can 20.

In similar fashion to that which has just been described, cable section 14 includes arrays or groups E through H. Each of these arrays are connected to its rearward can 24 through connections 50 and 60, 52 and 62, 54 and 64, and 56 and 66, respectively. Inside can 24, these respective connections are made to electronic assembly 58, which assembly is substantially identical to electronic assemblies 38 and 40. Also, these respective arrays or groups are made up through the internal wiring 60, 62, 64 and 66 in cable section 14 to can 22, which is the forward can to cable section 14. The connections terminate there in four connections to electronic assembly 38.

Inside can 22, these latter four connections 60, 62, 64 and 66, are connected to additional wiring 68, 70, 72 and 74, this additional wiring being included in cable section 12 for connecting to electronic assembly 40 in can 20. Therefore, with respect to an electronic assembly, for example logic assembly 38, there are three sets of inputs. One set is from the four arrays in the preceding cable section, such as on input lines 42, 44, 46 and 48, respectively. Four inputs are from the respective groups in the succeeding cable section as represented by inputs on wiring 60, 62, 64 and 66. Finally, there are four inputs from the four arrays in the section which succeeds the next rearward section. Two cans are used for making these connections, namely, cans 24 and 22. In the drawing, it will be seen that these last connections are represented by wiring connections 76, 78, 80, and 82 in cable section 14, but emanate originally from the four detector arrays in section 16, (shown in FIG. 1, but only detector arrays I and J shown in FIG. 2).

A group interval is described as the distance between the physical center of one group to the physical center of an adjoining group and is represented in FIG. 2 as interval 84. It is noted that since the sections are all identical, the interval or group distance 84 is substantially constant throughout the cable, and even from adjoining groups in two cable sections, since the cans do not provide any intergroup dimensional elongation.

The logic circuits which are part of the electronic assembly in the respective cans are controlled by control logic signals which are produced on the marine vessel and which are carried by suitable wiring to the respective cans. In the illustration, these control signals and the output signals from the logic assemblies are carried in suitable wiring 86 in cable section 12, in suitable wiring 88 in cable section 14, and in suitable wiring 90 in cable section 16. The connections to the suitable cable section wiring into and out of the respective logic assemblies 40, 38 and 58, are connections 92, 94 and 96. Although illustrated with respect to a common-type connection, separate wiring may be employed, if desired. Common connections are appropriate, however, since controls signals that are appropriately coded and-/or time separated can be used. The developed or produced output signals, similarly are conveniently separated by time multiplexing and are readily transmitted on a common connection.

One method of operating the cable arrangement which has just been described, is to provide control logic signals for producing an output from each of the fundamental groups A through J in sequential time. That is, a suitable signal would be produced as developed by group A, another signal would be produced by group B, another signal would be produced by group C, and so forth.

However, a preferred method of connecting and operating the array groups is with respect to tapering or weighting the response to accomplish selective attenuation of unwanted signals and relative enhancement of other signals for any number of possible reasons. This flexible operating filtering can be conveniently explained in connection with the simplified diagram shown in FIG. 3.

The logic selection assembly shown in FIG. 3 is included in each one of cans 20, 22, 24, etc., employed in the streamer cable. The assembly includes a plurality of operational amplifiers. Operational amplifiers 110, 112, 114 and 116 are illustrated by way of example. Each of the operational amplifiers is connected in a summing mode with, for example, seven input weighting resistors and a feedback resistor. The input resistors connected to operational amplifier 110 are resistors 118a, 119a, 120a, 121a, 122a, 123a and 124a and the feedback resistor is 126a. The respective inputs connected to the input resistors are the respective outputs from the detector groups or subarrays previously described. The input resistors connected to operational amplifier 112 are resistors 118b–124b and the feedback resistor is 126b. The input resistors connected to operational amplifier 114 are resistors 118c–124c and the feedback resistor is 126c.

Finally, the input resistors connected to operational amplifier 116 are resistors 118d–124d and the feedback resistor is 126d.

The outputs of the operational amplifiers are connected into a multiplexer 128. The multiplexer is controlled by memory circuit 130, which, in turn, is operated by logic circuit 132. The memory circuit is loaded via the control input prior to each shot by vessel electronics.

Many conditions tend to cause the actual sensed acoustic signal received at a single detector to be other than the true and undistorted seismic signal. For example, there are many spurious sources of noise such as from wave action, boats, echoes from fixed structures and the like. Moreover, it is also apparent that when detectors are arrayed, the outputs from all of the detectors are desirably not combined at the same response strength or weight, the response from the center detector normally being entitled to the greater weight. Also, signals from an array near the front of the cable are not subjected to the same spurious influences as the signals from an array near the rear of the cable. So as to equate the two, one group of these signals needs to be attenuated with respect to the other group (or alternatively, enhanced with respect to the other group).

The above mentions just a few of the influences that tend to disturb and/or distort a true seismic signal as it is developed. The terminology that applies to modifying the actual detected response so that it is corrected to remove these influences, is referred to as "tapering" or "weighting" the response. In a manner of speaking, weighting a response is performed by a dynamic filtering procedure. For example, in the situation where there are seven summing elements and it is desirable that the signal from the central (fourth) group or subarray is twice as important as the signal from either of the end groups (the first and the seventh groups or subarrays), then the signals from the end groups are reduced by one-half compared with signals from the center group.

A convenient way of accomplishing this signal weighting is illustrated in FIG. 3. The ratio of input resistor (e.g., resistor 118a) to feedback resistor (e.g., resistor 126a) will determine the gain of operational amplifier 110 with respect to the signal applied via resistor 118a. By having different values for resistors 118a–124a with respect to the same feedback resistor 126a, the response of the individual groups or subarrays connected respectively to resistor 118a–124a are "weighted".

In some situations it is desirable to sample only a single group signal. If this is desirable, then all of the groups are grounded other than the one from which the desirable signal is sampled. This effectively places an infinite "weight" on the non-sampled groups.

In practice, the groups in the array can be connected through the respective weighting resistors and operational amplifiers so that, in the example shown, four pre-weighted possibilities exist for the outputs from the same array. That is, all of the connections to each operational amplifier 110, 112, 114 and 116 are from the same groups A–G. However, because the resistor ratios 119a–124b and 126a are different from resistor ratios 118b–124b and 126b and so forth, the outputs from the respective operational amplifiers reflect the different pre-weighting. Each of them, in the example, is still centered on group D, so the eventual output under the connections illustrated will be an output trace for group D, as selectively weighted in the manner described. These four differently weighted outputs are connected to multiplexer 128. Memory 130 can be pre-programmed to select one or a combination of these outputs. Logic circuit 132 is operated by a suitable control input to step the memory circuit to the selection desired by the operator or by automatic operation.

It may be seen that if it is desirable to weight an array response different in section 12 of the cable from an array response in section 14, this is readily accomplished by logic operation in the manner just described, even though all of the hard-wiring is the same. Of course, not all of the hard-wiring has to be the same, the resistors connected to the operational amplifiers being conveniently included in replaceable thin film resistor packs.

In addition to varying the weighting from the individual arrays, another flexibility of connection is that additional arrays can be selectively added to form a grouparray response. This is done by selectively choosing as a composite array those adjoining arrays that make up the desired group length. Then, it is possible to select for the next group signal, the same number of arrays that would include some of the same individual groups but would, for example, drop one forward group and pick up a rearward group. In such example, the group interval would be interval 84, the same as the interval for operating with respect to single arrays, even though there may be seven groups in an array.

Furthermore, in the above example, the seven arrays may be further weighted in the same manner and with the same physical arrangement described above for weighting the individual responses from the groups or subarrays within an array.

Although, again by way of example, the group interval that has been described is interval 84, it may also be, if desired, multiples of interval 84.

There are many other possibilities existing for operation in addition to that described above, although the connections and physical arrangements would be somewhat modified. For example, in describing the connections in FIG. 3 it was assumed that all of the connections for a common group came from the same array. Some of the connections could, however, come from individual connections in an adjoining group, since one preferred physical cable arrangement spaces the detectors equally regardless whether the groups are within a single array or within adjacent arrays. With this flexibility the "group" interval could be reduced to the distance between individual detectors, if desired.

Although the preferred embodiment describes cable sections wherein the detectors therein are positioned physically without any overlap, it should be apparent, that the connection for logic selection in accordance with the above does not preclude a physical overlapping arrangement.

Furthermore, the longitudinal spacing of the detectors can be non-uniform, if desired, or logically selected in a non-uniform spatial manner.

Finally, it should be noted that logic circuit 132 can include clock means for changing the weighted response with time (as well as selectively with distance, as has been described above). In this mode of operation, the first time period of response selects with the array or groups of arrays a particular weighted response (e.g., as determined by operational amplifier 110 and the resistances connected thereto). During the next time period of response, the logic assembly operates in conjunction with another weighted response (e.g., as determined by operational amplifier 112 and its input resistances).

Therefore, while a particular embodiment of the n has been shown and described, even with numerous variations, it will be understood that the invention is not limited thereto, since modifications may be made and will become apparent to those skilled in the art. For example, four fundamental groups of seven detectors each over a 12.5 meter length are illustrated for each of the cable sections. Obviously, these group lengths, and/or numbers of detectors per group and/or detector spacing may be changed, as desired. Also, there may be more or less than four groups per cable section, as desired.

What is claimed is:

1. A marine seismic cable including a plurality of identical sections successively connected together by identical end connectors,
   each of said sections comprising a plurality of linearly arrayed pressure detector groups which produce a composite electrical signal in response to the immediate pressure on the individual detectors within the group, each of said groups having the same number of detectors,
   each of said connectors comprising an electronic assembly for receiving said separate composite signals from the plurality of detector groups in the preceding cable section to a first side of said connector and for receiving separate composite signals from the plurality of detector groups in the succeeding cable section to the second side of said connector for producing selectable-and-combinable outputs signals from said first side composite signals and said second side composite signals,
   each of said cable sections further comprising wiring for connecting said end connector to the opposite end connector to carry signals originating from detectors in said cable section, signals originating from detectors in the suceeding cable section, and said selectable-and-combinable output signals.

2. A marine seismic cable in accordance with claim 1, wherein said electronic assembly selectably connects combinations of detector groups together so as to produce combination composite signals.

3. A marine seismic cable in accordance with claim 2, wherein said electronic assembly includes a logic circuit for selectably connecting sequential combinations of detector groups together so that at least one detector group is included in each of such connections.

4. A marine seismic cable in accordance with claim 1, wherein the spacing between the groups separating adjacent detectors in successive groups are substantially the same distance apart as the detector spacing within the groups.

5. A marine seismic cable including a plurality of identical sections successively connected together by identical end connectors,
   each of said sections comprising a plurality of linearly arrayed pressure detector groups which produce a composite electrical signal in response to the pressure on the individual detectors within the group, each of said groups having the same number of detectors, the spacing between detectors within the groups being substantially the same as the spacing separating the contiguous detectors in adjacent groups,
   each of said end connectors comprising an electronic assembly for receiving said separate composite signals from the plurality of detector groups in the cable section preceding said connector and for receiving separate composite signals from the plurality of detector groups in the cable section succeeding said connector and from the plurality of detector groups in the cable section next succeeding said succeeding cable section,
   each of said cable sections further comprising first wiring for connecting signals from the preceding end connector for signals originating from detectors preceding said preceding end connector,
   second wiring for connecting signals to said preceding end connector from the succeeding end connector for signals originating from detectors succeeding said succeeding end connector,
   third wiring for selectively operatively connecting said electronic assemblies to produce therefrom output responses from said detector groups, and
   fourth wiring for communicating the outputs from said electronic assemblies for recording.

6. A marine seismic cable in accordance with claim 5, and including for each of said detector groups means for weighting the output thereof.

7. A marine seismic cable in accordance with claim 6, wherein each of said weighting means includes means for tapering that is different from each of the other means for weighting as a function of distance.

8. A marine seismic cable in accordance with claim 5, and including for each of said detector groups a plurality of means for differently weighting the output thereof, and means for operationally selecting from said different weighting means.

9. A marine seismic cable in accordance with claim 5, wherein each of said detector groups is connected to a selectable plurality of means for differently weighting the output thereon.

10. A marine seismic cable in accordance with claim 9, wherein said selectable plurality of means includes dynamic summing means for dynamically differentially weighting the output.

11. A marine seismic cable in accordance with claim 9, and including logic means connected to each of said different weighting means for operationally selecting therefrom.

12. A marine seismic cable in accordance with claim 9, and including logic clock means connected to each of said different weighting means for operationally selecting therefrom.

* * * * *